(12) United States Patent
Himeda

(10) Patent No.: US 11,180,640 B2
(45) Date of Patent: Nov. 23, 2021

(54) RUBBER COMPOSITION FOR TREAD AND TIRE

(71) Applicant: Sumitomo Rubber Industries, Ltd., Kobe (JP)

(72) Inventor: Shingo Himeda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 388 days.

(21) Appl. No.: 16/467,833

(22) PCT Filed: Dec. 5, 2017

(86) PCT No.: PCT/JP2017/043699
§ 371 (c)(1),
(2) Date: Jun. 7, 2019

(87) PCT Pub. No.: WO2018/105625
PCT Pub. Date: Jun. 14, 2018

(65) Prior Publication Data
US 2021/0332220 A1 Oct. 28, 2021

(30) Foreign Application Priority Data

Dec. 9, 2016 (JP) .............................. JP2016-239408

(51) Int. Cl.
| | | |
|---|---|---|
| *C08L 7/00* | (2006.01) |
| *B60C 1/00* | (2006.01) |
| *C08L 9/06* | (2006.01) |
| *C08K 5/18* | (2006.01) |
| *C08L 9/00* | (2006.01) |
| *C08L 91/06* | (2006.01) |
| *C08K 5/47* | (2006.01) |
| *C08K 5/09* | (2006.01) |
| *C08K 3/04* | (2006.01) |
| *C08K 3/06* | (2006.01) |
| *C08K 3/22* | (2006.01) |

(52) U.S. Cl.
CPC .............. *C08L 7/00* (2013.01); *B60C 1/0016* (2013.01); *C08L 9/06* (2013.01); *C08K 3/04* (2013.01); *C08K 3/06* (2013.01); *C08K 3/22* (2013.01); *C08K 5/09* (2013.01); *C08K 5/18* (2013.01); *C08K 5/47* (2013.01); *C08L 9/00* (2013.01); *C08L 91/06* (2013.01); *C08L 2205/03* (2013.01)

(58) Field of Classification Search
CPC .......... C08L 7/00; C08L 9/06; C08L 2205/03; C08L 9/00; C08L 91/00; C08L 91/06; B60C 1/0016; C08K 3/04; C08K 5/18; C08K 5/09; C08K 3/22; C08K 3/06; C08K 5/47
USPC ......................................................... 524/495
See application file for complete search history.

(56) References Cited

U.S. PATENT DOCUMENTS

| | | |
|---|---|---|
| 2012/0302664 A1 | 11/2012 | Kamada |
| 2015/0299436 A1 | 10/2015 | Shin et al. |
| 2016/0122518 A1 | 5/2016 | Tokimune et al. |

FOREIGN PATENT DOCUMENTS

| | | |
|---|---|---|
| CN | 102798295 A | 11/2012 |
| CN | 105408410 A | 3/2016 |
| CN | 106046459 A | 10/2016 |
| EP | 3546512 A1 * | 11/2017 |
| JP | 57-207629 A | 12/1982 |
| JP | 60-61313 A | 4/1985 |
| JP | 2-22348 A | 1/1990 |
| JP | 2000-211313 A | 8/2000 |
| JP | 2000-219778 A | 8/2000 |
| JP | 2009-24043 A | 2/2009 |
| JP | 2014-24890 A | 2/2014 |
| JP | 2015-164985 A | 9/2015 |
| JP | 2015-206029 A | 11/2015 |

OTHER PUBLICATIONS

International Search Report (PCT/ISA/210) issued in PCT/JP2017/043699, dated Feb. 20, 2018.
Written Opinion (PCT/ISA/237) issued in PCT/JP2017/043699, dated Feb. 20, 2018.
Chinese Office Action and Search Report, dated Apr. 8, 2021, for Chinese Application No. 201780076050.X, with an English translation of the Chinese Office Action.

\* cited by examiner

*Primary Examiner* — William K Cheung
(74) *Attorney, Agent, or Firm* — Birch, Stewart, Kolasch & Birch, LLP

(57) ABSTRACT

A rubber composition for a tread comprising: 10 to 30 parts by mass of carbon black A having an iodine adsorption amount of 130 mg/g or more and 20 to 50 parts by mass of carbon black B having an iodine adsorption amount of 110 mg/g or more and less than 130 mg/g based on 100 parts by mass of a rubber component comprising 25 to 45% by mass of a styrene-butadiene rubber having a styrene content of 15% by mass or less and a vinyl content of from 30 to 50 mol %, 45 to 65% by mass of an isoprene-based rubber and 5 to 15% by mass of a butadiene rubber, wherein assuming that a content of the carbon black A is X part by mass, a content of the carbon black B is 0.6X to 4.5X part by mass.

3 Claims, No Drawings

RUBBER COMPOSITION FOR TREAD AND TIRE

TECHNICAL FIELD

The present invention relates to a rubber composition for a tread and a tire having a tread composed of the rubber composition.

BACKGROUND OF THE INVENTION

Some tires, in particular, tires for heavy load application for trucks and buses and tires for running on an irregular ground, are provided with independent blocks surrounded by a tread pattern (grooves) on a tread. These blocks contribute to transferring of a driving force and a braking force, steering stability on snow and a muddy road surface, and improvement of drainage. However, chipping of blocks is apt to arise due to running on a rough road and aged deterioration, and if the chipping occurs, performance which the tire originally has is hardly exhibited.

Patent Document 1 describes a rubber composition for a tread, in which block chipping resistance is improved by allowing the rubber composition to comprise crystallized carbon black. However, there is room for improvement.

PRIOR ART DOCUMENT

Patent Document

Patent Document 1: JP 2014-024890 A

SUMMARY OF THE INVENTION

Problem to be Solved by the Invention

An object of the present invention is to provide a rubber composition for a tread having good block chipping resistance and a tire having a tread composed of the rubber composition.

Means to Solve the Problem

The present invention relates to a rubber composition for a tread comprising:
10 to 30 parts by mass of carbon black A having an iodine adsorption amount of 130 mg/g or more and
20 to 50 parts by mass of carbon black B having an iodine adsorption amount of 110 mg/g or more and less than 130 mg/g
based on 100 parts by mass of a rubber component comprising 25 to 45% by mass of a styrene-butadiene rubber having a styrene content of 15% by mass or less and a vinyl content of from 30 to 50 mol %, 45 to 65% by mass of an isoprene-based rubber and 5 to 15% by mass of a butadiene rubber,
wherein assuming that a content of the carbon black A is X part by mass, a content of the carbon black B is 0.6X to 4.5X part by mass.

The present invention further relates to a tire having a tread composed of the above-mentioned rubber composition for a tread.

Effects of the Invention

The tire having a tread composed of the rubber composition for a tread of the present invention is good in block chipping resistance.

EMBODIMENT FOR CARRYING OUT THE INVENTION

The rubber composition for a tread of one embodiment of the present invention is characterized by comprising a rubber component comprising specific styrene-butadiene rubber, isoprene-based rubber and butadiene rubber and carbon black A and carbon black B having different iodine adsorption amounts in predetermined amounts.

In the rubber composition for a tread according to one embodiment of the present invention, it can be considered that by dispersing a styrene butadiene rubber in an isoprene/butadiene polymer, an impact generated when running on a rough road is relaxed, and further by using a styrene butadiene rubber having a low styrene content (low styrene SBR) as a styrene butadiene rubber and the carbon black A having a small particle size, contact of the SBR with carbon black A is increased and a reinforcing effect on the rubber composition is enhanced, thereby block chipping resistance is improved. Further, since the styrene content of the SBR is small, it can be considered that heat generation can be made small and lowering of block stiffness due to running can be inhibited, thereby synergistically enhancing block chipping resistance.

<Rubber Component>

The rubber component comprises a specific styrene-butadiene rubber having a low styrene content (low styrene SBR), isoprene-based rubber and butadiene rubber (BR).

(SBR)

A styrene content of the low styrene SBR is 15% by mass or less, preferably 12% by mass or less. When the styrene content exceeds 15% by mass, an effect of the present invention tends to become insufficient. Further, the styrene content is preferably 2% by mass or more, more preferably 5% by mass or more, further preferably 8% by mass or more for the reason that an effect of the present invention can be obtained sufficiently. It is noted that herein the styrene content of the SBR is calculated in accordance with 1H-NMR measurement.

A vinyl content of the low styrene SBR is 30 mol % or more, preferably 33 mol % or more, more preferably 35 mol % or more. When the vinyl content is less than 30 mol %, wet grip performance tends to decrease. On the other hand, the vinyl content is 50 mol % or less, preferably 48 mol % or less, more preferably 45 mol % or less. When the vinyl content exceeds 50 mol %, there is a tendency that heat generation is increased.

A weight-average molecular weight (Mw) of the low styrene SBR is preferably not less than 100,000, more preferably not less than 150,000, further preferably not less than 250,000 from the viewpoint of abrasion resistance. On the other hand, the Mw is preferably not more than 2,000,000, more preferably not more than 1,000,000 from the viewpoint of crosslinking uniformity. It is noted that the Mw can be calibrated with standard polystyrene based on measurement values determined by gel permeation chromatography (GPC) (GPC-8000 series manufactured by Tosoh Corporation; detector: differential refractometer; column: TSKGEL SUPERMALTPORE HZ-M manufactured by Tosoh Corporation).

The low styrene SBR is not particularly limited, and examples thereof include a solution-polymerized SBR (S-SBR), an emulsion-polymerized SBR (E-SBR), a modified SBR thereof (modified S-SBR, modified E-SBR) and the like. Examples of the modified SBR include an end-modified and/or main-chain-modified SBR, a modified SBR coupled with a tin or silicon compound or the like (such as a condensate, one having a branch structure, etc.) and the like. Among these, S-SBR is preferable.

Examples of S-SBR usable in one embodiment of the present invention include S-SBRs manufactured and sold by JSR Corporation, Sumitomo Chemical Company, Limited, Ube Industries, Ltd., Asahi Kasei Corporation, ZEON CORPORATION, etc.

A low styrene SBR content in the rubber component is not less than 25% by mass, preferably not less than 30% by mass, more preferably not less than 35% by mass. When the low styrene SBR content is less than 25% by mass, there is a tendency that an effect of the present invention becomes insufficient. On the other hand, the low styrene SBR content is not more than 45% by mass, preferably not more than 42% by mass. When the content exceeds 45% by mass, there is a tendency that heat generation is increased.

(Isoprene-Based rubber)

Examples of the isoprene-based rubber include a natural rubber (NR), modified natural rubbers such as an epoxidized natural rubber (ENR), a hydrogenated natural rubber (HNR), a deproteinized natural rubber (DPNR) and an ultra pure natural rubber (UPNR), and an isoprene rubber (IR). Examples of the usable NR include SIR20, RSS #3, TSR20 and the like, and for example, IRs usually used in a tire industry can be used as the IR.

A content of the isoprene-based rubber in the rubber component is not less than 45% by mass, preferably not less than 48% by mass. When the content is less than 45% by mass, there is a tendency that an effect of the present invention becomes insufficient. On the other hand, the content of the isoprene-based rubber is not more than 65% by mass, preferably not more than 60% by mass. When the content exceeds 65% by mass, crack growth resistance tends to decrease.

(BR)

BR is not limited particularly, and examples thereof include a high cis BR having a content of cis-1,4 bond of not less than 90%, an end-modified and/or main-chain-modified BR, a BR comprising 1,2-syndiotactic polybutadiene crystals (SPB-containing BR), a modified BR coupled with a tin or silicon compound or the like (such as a condensate, one having a branch structure, etc.) and the like. Among these BRs, a high cis BR is preferable for the reason that abrasion resistance is good.

Examples of the high-cis BRs usable in one embodiment of the present invention include high-cis BRs manufactured and sold by JSR Corporation, Sumitomo Chemical Company, Limited, Ube Industries, Ltd., Asahi Kasei Corporation, ZEON CORPORATION and the like.

A content of the BR in the rubber component is not less than 5% by mass, preferably not less than 8% by mass. When the content is less than 5% by mass, there is a tendency that an effect of the present invention becomes insufficient. On the other hand, the content of the BR is not more than 15% by mass, preferably not more than 12% by mass. When the content exceeds 15% by mass, block chipping tend to be easily generated.

(Other Rubber Components)

In one embodiment of the present invention, the rubber components may comprise rubber components other than the low styrene SBR, isoprene-based rubber and BR. Examples thereof include SBR other than the low styrene SBR, a styrene-isoprene-butadiene copolymer rubber (SIBR), a styrene-isobutylene-styrene block copolymer (SIBS) and the like. These other rubber components may be used alone, or may be used in combination of two or more thereof.

<Carbon Black>

The rubber composition for a tread according to one embodiment of the present invention is characterized by comprising small particle size carbon black (carbon black A) having an iodine adsorption amount of 130 mg/g or more and general-purpose carbon black (carbon black B) having an iodine adsorption amount of 110 mg/g or more and less than 130 mg/g in predetermined amounts. Compounding amounts and ratios of the both are determined as mentioned below in consideration of a balance between block chipping resistance and heat build-up characteristics and the like of the rubber composition for a tread according to one embodiment of the present invention.

An iodine adsorption amount of the carbon black A is 130 mg/g or more, preferably 135 mg/g or more, more preferably 140 mg/g or more. When the iodine adsorption amount of the carbon black A is less than 130 mg/g, there is a tendency that block chipping resistance becomes insufficient. An upper limit of the iodine adsorption amount of the carbon black A is not limited particularly, and is preferably 180 mg/g or less, more preferably 160 mg/g or less, further preferably 150 mg/g or less from the viewpoint of processability.

The content of the carbon black A is not less than 10 parts by mass, preferably not less than 15 parts by mass based on 100 parts by mass of the rubber component. When the content is less than 10 parts by mass, there is a tendency that block chipping resistance becomes insufficient. On the other hand, the content of the carbon black A is not more than 30 parts by mass, preferably not more than 25 parts by mass, more preferably not more than 20 parts by mass. When the content exceeds 30 parts by mass, there is a tendency that heat generation is liable to arise.

An iodine adsorption amount of the carbon black B is 110 mg/g or more, preferably 115 mg/g or more, more preferably 120 mg/g or more. When the iodine adsorption amount of the carbon black B is less than 110 mg/g, there is a tendency that reinforceability becomes insufficient. Further, the iodine adsorption amount of the carbon black B is less than 130 mg/g, more preferably 125 mg/g or less. When the iodine adsorption amount of the carbon black B is 130 mg/g or more, there is a tendency that heat generation is liable to arise.

The content of the carbon black B is not less than 20 parts by mass, preferably not less than 22 parts by mass based on 100 parts by mass of the rubber component. When the content is less than 20 parts by mass, there is a tendency that an effect of the present invention becomes insufficient. On the other hand, the content of the carbon black B is not more than 50 parts by mass, preferably not more than 40 parts by mass. When the content exceeds 50 parts by mass, there is a tendency that reinforceability becomes insufficient.

Further, assuming that the content of the carbon black A based on 100 parts by mass of the rubber component is X part by mass, the content of the carbon black B is 0.6X to 4.5X part by mass, preferably 1.0X to 2.5X part by mass. When the ratio of the content of the carbon black B to the content of the carbon black A is within the range mentioned above, an effect of the present invention is exhibited sufficiently.

<Other Components>

In addition to the above-mentioned components, other compounding components commonly used in the manufacturing of the rubber composition, for example, fillers other than the above-mentioned carbon black (other fillers), zinc oxide, stearic acid, antioxidants, processing aids, waxes, softening agents, vulcanizing agents, vulcanization accelerators and the like can be optionally compounded in the rubber composition for a tread in one embodiment of the present invention.

The above-mentioned other fillers are not limited particularly, and examples thereof include silica, aluminum hydroxide, alumina (aluminum oxide), calcium carbonate, talc and the like. These fillers can be used alone or can be used in combination with two or more kinds thereof.

Silica is not limited particularly, and examples thereof include silica prepared by a dry method (anhydrous silica), silica prepared by a wet method (hydrous silica) and the like. Hydrous silica prepared by a wet method is preferred for the reason that many silanol groups are contained.

A nitrogen adsorption specific surface area ($N_2SA$) of silica is preferably 80 $m^2/g$ or more, more preferably 100 $m^2/g$ or more from the viewpoint of durability and elongation at break. The nitrogen adsorption specific surface area of silica is preferably 250 $m^2/g$ or less, more preferably 220 $m^2/g$ or less from the viewpoint of fuel efficiency and processability. It is noted that herein the $N_2SA$ of silica is a value measured in accordance with ASTM D3037-93.

When the rubber composition comprises the silica, the content thereof is preferably not less than 5 parts by mass, more preferably not less than 10 parts by mass based on 100 parts by mass of the rubber component, from the viewpoint of durability and an elongation at break. On the other hand, the content of the silica is preferably not more than 200 parts by mass, more preferably not more than 150 parts by mass, from the viewpoint of enhancing dispersibility during kneading and for inhibiting lowering of processability due to re-agglomeration of silica during heating at rolling and during storage after rolling.

Silica is preferably used in combination with a silane coupling agent. The silane coupling agent may be any silane coupling agents conventionally used in conjunction with silica in the rubber industry. Examples of the silane coupling agent include sulfide-based silane coupling agents such as bis(3-triethoxysilylpropyl) disulfide and bis(3-triethoxysilylpropyl) tetrasulfide; mercapto-based silane coupling agents such as 3-mercaptopropyltrimethoxysilane and NXT-Z100, NXT-Z45, NXT and the like manufactured and sold by Momentive Performance Materials (silane coupling agents having a mercapto group); vinyl-based silane coupling agents such as vinyltriethoxysilane; amino-based silane coupling agents such as 3-aminopropyltriethoxysilane; glycidoxy-based silane coupling agents such as γ-glycidoxypropyltriethoxysilane; nitro-based silane coupling agents such as 3-nitropropyltrimethoxysilane; and chloro-based silane coupling agents such as 3-chloropropyltrimethoxysilane. These silane coupling agents may be used alone or may be used in combination of two or more thereof.

When the rubber composition comprises a silane coupling agent, the content thereof is preferably not less than 4.0 parts by mass, more preferably not less than 6.0 parts by mass based on 100 parts by mass of silica for the reason that sufficient effects of improving dispersibility of fillers and decreasing a viscosity and the like can be obtained. On the other hand, the content of the silane coupling agent is preferably not more than 12 parts by mass, more preferably not more than 10 parts by mass based on 100 parts by mass of silica. When the content of the silane coupling agent exceeds 12 parts by mass, sufficient coupling effect and silica dispersing effect cannot be obtained and the reinforcing property deteriorates.

The antioxidant is not particularly limited, and any antioxidants conventionally used in a field of rubbers can be used. Examples of the antioxidant include quinoline-based antioxidants, quinone-based antioxidants, phenol-based antioxidants, phenylenediamine-based antioxidants and the like.

When the rubber composition comprises the antioxidant, the content thereof is preferably not less than 0.5 part by mass, more preferably not less than 0.8 part by mass based on 100 parts by mass of the rubber component. On the other hand, the content of the antioxidant is preferably not more than 2.0 parts by mass, more preferably not more than 1.5 parts by mass, further preferably not more than 1.2 parts by mass from the viewpoint of dispersibility of the filler and the like, elongation at break and kneading efficiency.

Examples of the processing aid include fatty acid metal salts such as zinc stearate and the like. Specifically there are, for example, fatty acid soap processing aids such as Struktol EF44 and WB16 available from Schill & Seilacher Struktol GmbH. A compounding amount of the processing aid is preferably not less than 0.1 part by mass based on 100 parts by mass of a total amount of rubber components, and is preferably not more than 5 parts by mass, particularly preferably not more than 3 parts by mass.

When the rubber composition comprises the stearic acid, the content thereof is preferably not less than 0.2 part by mass, more preferably not less than 1 part by mass based on 100 parts by mass of the rubber component from the viewpoint of obtaining a vulcanization rate On the other hand, the content thereof is preferably not more than 10 parts by mass, more preferably not more than 5 parts by mass, from the viewpoint of processability.

When the rubber composition comprises the zinc oxide, the content thereof is preferably not less than 0.5 part by mass, more preferably not less than 1 part by mass based on 100 parts by mass of the rubber component from the viewpoint of obtaining a vulcanization rate. On the other hand, the content thereof is preferably not more than 10 parts by mass, more preferably not more than 5 parts by mass, from the viewpoint of abrasion resistance.

When the rubber composition comprises the wax, the content thereof is preferably not less than 0.5 part by mass, more preferably not less than 1 part by mass based on 100 parts by mass of the rubber component from the viewpoint of securing weather resistance of a rubber. On the other hand, the content thereof is preferably not more than 10 parts by mass, more preferably not more than 5 parts by mass, from the viewpoint of preventing whitening of a tire due to blooming of the wax.

The softening agent means a component soluble in acetone, and examples thereof include oil such as process oil and vegetable fats and oils, liquid diene polymers and the like. These softening agents may be used alone or may be used in combination of two or more thereof. Among these, oil is preferred.

Examples of oil include a process oil, vegetable fats and oils, or a mixture thereof. Examples of process oil include a paraffin process oil, a naphthenic process oil, an aromatic process oil (aromatic oil) and the like. Examples of vegetable oils and fats include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, tsubaki oil, jojoba oil, macadamia nut oil, tung oil, and the like. Among these, aromatic oil is preferred.

The liquid diene polymer is not limited particularly as long as it is a liquid diene polymer having a weight-average molecular weight of not more than 50,000. Examples thereof include a styrene-butadiene copolymer (rubber), a butadiene polymer (rubber), an isoprene polymer (rubber), an acrylonitrile-butadiene copolymer (rubber) and the like. Among the liquid diene polymers, liquid styrene-butadiene copolymer (liquid styrene-butadiene rubber (liquid SBR)) is preferable for the reason that on-ice and snow performance is good. Further the liquid butadiene polymer (liquid butadiene rubber (liquid BR)) is preferable for the reason that an effect of enhancing abrasion resistance is remarkable.

A weight-average molecular weight (Mw) of the liquid diene polymer is preferably not less than 1,000, more preferably not less than 1,500 for the reason that an effect of enhancing abrasion resistance is satisfactory. On the other hand, the weight-average molecular weight is preferably not more than 50,000, more preferably not more than 20,000, more preferably not more than 15,000 from the viewpoint of on-ice and snow performance. It is noted that herein the weight-average molecular weight (Mw) can be calibrated with standard polystyrene based on measurement values determined with a gel permeation chromatograph (GPC) (GPC-8000 series manufactured by Tosoh Corporation; detector: differential refractometer; column: TSKGEL SUPERMALTPORE HZ-M manufactured by Tosoh Corporation).

A content of the softening agent is preferably not less than 1 part by mass, more preferably not less than 3 parts by mass based on 100 parts by mass of the rubber component from the viewpoint of processability. On the other hand, the content of the softening agent is preferably not more than 10 parts by mass, more preferably not more than 5 parts by mass from the viewpoint of block chipping resistance and abrasion resistance.

The vulcanizing agent is not limited particularly, and those usually used in a tire industry can be used. From the viewpoint that an effect of the present invention can be obtained satisfactorily, sulfur is preferable, and powdered sulfur is more preferable. Further sulfur may be used in combination with other vulcanizing agents. Examples of other vulcanizing agents include a vulcanizing agent containing a sulfur atom such as TACKIROL V200 manufactured by Taoka Chemical Co., Ltd., DURALINK HTS (1,6-hexamethylene-sodium dithiosulfate dihydrate) manufactured by Flexsys, KA9188 (1,6-bis(N,N'-dibenzylthiocarbamoyldithio)hexane) manufactured by LANXESS K.K. and the like, an organic peroxide such as a dicumyl peroxide and the like.

When the rubber composition comprises the vulcanizing agent, the content thereof is preferably 0.1 part by mass or more, more preferably 0.5 part by mass or more based on 100 parts by mass of the rubber component. On the other hand, the content of the vulcanizing agent is preferably 15 parts by mass or less, more preferably 5 parts by mass or less.

Examples of a vulcanization accelerator include sulfenamide-, thiazole-, thiuram-, thiourea-, guanidine-, dithiocarbamate-, aldehyde amine- or aldehyde ammonia-, imidazoline- and xanthate-based vulcanization accelerators. These vulcanization accelerators may be used alone or may be used in combination of two or more thereof. Among these, sulfenamide-based vulcanization accelerators, thiazole-based vulcanization accelerators and guanidine-based vulcanization accelerators are preferred, and sulfenamide-based vulcanization accelerators are preferred more.

Examples of sulfenamide-based vulcanization accelerators include N-t-butyl-2-benzothiazolylsulfenamide (TBBS), N-cyclohexyl-2-benzothiazolylsulfenamide (CBS), N,N'-dicyclohexyl-2-benzothiazolylsulfenamide (DCBS) and the like. Among these, N-t-butyl-2-benzothiazolylsulfenamide (TBBS) and N-cyclohexyl-2-benzothiazolylsulfenamide (CBS) are preferred.

Examples of the thiazole-based vulcanization accelerator include 2-mercaptobenzothiazole, cyclohexylamine salt of 2-mercaptobenzothiazole, di-2-benzothiazolyl disulfide and the like. Among these, 2-mercaptobenzothiazole is preferable.

Examples of the guanidine-based vulcanization accelerator include 1,3-diphenylguanidine, 1,3-di-o-tolylguanidine, 1-o-tolylbiguanide, di-o-tolylguanidine salt of dicatechol borate, 1,3-di-o-cumenylguanidine, 1,3-di-o-biphenylguanidine, 1,3-di-o-cumenyl-2-propionylguanidine and the like. Among these, 1,3-diphenylguanidine is preferable.

When the rubber composition comprises the vulcanization accelerator, the content thereof is preferably not less than 0.5 part by mass, more preferably not less than 1.0 part by mass based on 100 parts by mass of the rubber component from the viewpoint of securing sufficient vulcanization rate. On the other hand, the content of the vulcanization accelerator is preferably not more than 10 parts by mass, more preferably not more than 5 parts by mass from the viewpoint of inhibiting blooming.

The rubber composition for a tread according to one embodiment of the present invention can be prepared by a usual method. The rubber composition can be prepared, for example, by a method of kneading the above-mentioned components other than the vulcanizing agent and the vulcanization accelerator with a generally well-known kneading machine used in a rubber industry such as a Banbury mixer, a kneader or an open roll and then adding the vulcanizing agent and the vulcanization accelerator, followed by further kneading and then conducting vulcanization, or by other method.

A tire according to another embodiment of the present invention can be produced by a usual method using the above-mentioned rubber composition for a tread. Namely, the tire can be produced by subjecting the rubber composition obtained by compounding the above-mentioned compounding agents according to necessity to the rubber components, to extrusion processing to a shape of a tread, and then laminating together with other tire members on a tire building machine and forming by a usual forming method, thus forming an unvulcanized tire, and heating and compressing this unvulcanized tire in a vulcanizer.

Example

The present invention will be described based on Examples, but the present invention is not limited thereto only.

A variety of chemicals used in Examples and Comparative Examples will be explained below.
NR: TSR20
SBR1: Non-oil extended solution-polymerized SBR (weight-average molecular weight: 250,000, styrene content: 10% by mass, vinyl content: 40 mol %)
SBR2: Non-oil extended solution-polymerized SBR (weight-average molecular weight: 450,000, styrene content: 24% by mass, vinyl content: 17 mol %)

BR: UBEPOL BR150B (high-cis BR, cis-1,4 bond content: 96%) manufactured by Ube Industries, Ltd.
Carbon black 1: SHOBLACK N110 manufactured by Cabot Japan K. K. (iodine adsorption amount: 145 mg/g)
Carbon black 2: SHOBLACK N220 manufactured by Cabot Japan K. K. (iodine adsorption amount: 121 mg/g)
Wax: Ozoace 355 manufactured by NIPPON SEIRO CO., LTD.
Antioxidant: NOCRAC 6C (N-(1,3-dimethylbutyl)-N'-phenyl-p-phenylenediamine) manufactured by OUCHI SHINKO CHEMICAL INDUSTRIAL CO., LTD.
Stearic acid: Stearic acid beads "Tsubaki" manufactured by NOF Corporation
Zinc oxide: Zinc Oxide No. 2 manufactured by Mitsui Mining & Smelting Co., Ltd.
Oil: TDAE oil manufactured by JX Nippon Oil & Energy Corporation Sulfur: Powdered sulfur manufactured by Tsurumi Chemical Industry Co., Ltd.
Vulcanization accelerator: Nocceler NS (N-tert-butyl-2-benzothiazolylsulfeneamide (TBBS)) manufactured by OUCHI SHINKO CHEMICAL INDUSTRIAL CO., LTD.

Examples and Comparative Examples

According to the compounding formulations shown in Table 1, all chemicals, other than sulfur and a vulcanization accelerator, were kneaded using a 1.7 L sealed Banbury mixer for five minutes up to a discharge temperature of 170° C. to obtain a kneaded product. Then, the obtained kneaded product was kneaded again (remilled) at a discharge temperature of 150° C. for four minutes by the Banbury mixer. Then, sulfur and a vulcanization accelerator were added to the obtained kneaded product, and kneaded for 4 minutes up to 105° C. using a biaxial open roll to obtain an unvulcanized rubber composition. The obtained unvulcanized rubber composition was press-vulcanized at 170° C. for 12 minutes to manufacture a test rubber composition.

Further, the obtained unvulcanized rubber composition was extruded and molded into the shape of a tire tread by an extruder equipped with a base having a predetermined shape, and then laminated with other tire members to form an unvulcanized tire, which was then press-vulcanized to manufacture a test tire (12R22.5, a tire for a truck and a bus).

The obtained unvulcanized rubber compositions, vulcanized rubber compositions and test tires were subjected to the following evaluation. The evaluation results are shown in Table 1.

(Block Chipping Resistance Index)
The respective test tires were mounted on all wheels of a vehicle (truck), and after running a distance of 8,000 km, a block chipping condition was visually observed and evaluated by a score. The result is indicated by an index obtained by the following equation, assuming that the score of Comparative Example 1 is 100. It shows that the larger the index is, the less the block chipping is and the higher the block chipping resistance is.

(Block chipping resistance index)=(Score of each formulation)/(Score of Comparative Example 1×100

(Abrasion Resistance)
The respective test tires were mounted on all wheels of a vehicle (truck), and after running a distance of 8,000 km, a groove depth of a tire tread portion was measured. Then, a running distance when the tire groove depth was reduced by 1 mm was measured. The result of each of the test tires is indicated by an index obtained by the following equation, assuming that a running distance when a tire groove depth of Comparative Example 1 was reduced by 1 mm is 100. It shows that the larger the index is, the better the abrasion resistance is. The index was obtained by the following equation.

(Abrasion resistance index)=(Running distance when the tire groove depth of each formulation was reduced by 1 mm)/(Running distance when the tire groove depth of Comparative Example 1 was reduced by 1 mm)×100

(Heat Build-Up Characteristic Index)
A loss tangent (tan δ) at 70° C. of each of the vulcanized rubber compositions was measured using a viscoelasticity spectrometer VES manufactured by IWAMOTO Quartz GlassLabo Co., Ltd. under the conditions of an initial strain of 10%, a dynamic strain of 2% and a frequency of 10 Hz. The result is indicated by an index obtained by the following equation, assuming that the tan δ of Comparative Example 1 is 100. It shows that the larger the index is, the better the heat build-up characteristic (fuel efficiency) is.

(Heat build-up characteristic index)=(tan δ of Comparative Example 1/(tan δ of each formulation)×100

TABLE 1

| Compounding amount | Example | | | | | | | |
|---|---|---|---|---|---|---|---|---|
| (part by mass) | 1 | 2 | 3 | 4 | 5 | 6 | 7 | 8 |
| NR | 50 | 50 | 55 | 55 | 45 | 45 | 50 | 50 |
| SBR 1 | 40 | 40 | 35 | 35 | 40 | 40 | 40 | 40 |
| SBR 2 | — | — | — | — | — | — | — | — |
| BR | 10 | 10 | 10 | 10 | 15 | 15 | 10 | 10 |
| Carbon black 1 | 15 | 25 | 25 | 30 | 15 | 25 | 15 | 15 |
| Carbon black 2 | 35 | 25 | 25 | 20 | 35 | 25 | 40 | 45 |
| Wax | 1.0 | 1.0 | 1.0 | 1.0 | 1.0 | 1.0 | 1.0 | 1.0 |
| Antioxidant | 2.0 | 2.0 | 2.0 | 2.0 | 2.0 | 2.0 | 2.0 | 2.0 |
| Stearic acid | 2.0 | 2.0 | 2.0 | 2.0 | 2.0 | 2.0 | 2.0 | 2.0 |
| Zinc oxide | 4.0 | 4.0 | 4.0 | 4.0 | 4.0 | 4.0 | 4.0 | 4.0 |
| Oil | 3.0 | 3.0 | 3.0 | 3.0 | 3.0 | 3.0 | 3.0 | 3.0 |
| Sulfur | 1.5 | 1.5 | 1.5 | 1.5 | 1.5 | 1.5 | 1.5 | 1.5 |
| Vulcanization accelerator | 1.5 | 1.5 | 1.5 | 1.5 | 1.5 | 1.5 | 1.5 | 1.5 |
| Evaluation | | | | | | | | |
| Block chipping resistance | 102 | 104 | 103 | 105 | 103 | 104 | 105 | 108 |
| Abrasion resistance | 95 | 97 | 95 | 97 | 100 | 105 | 100 | 105 |
| Heat build-up characteristic | 105 | 105 | 109 | 106 | 105 | 103 | 100 | 96 |

| Compounding amount | Comparative Example | | | |
|---|---|---|---|---|
| (part by mass) | 1 | 2 | 3 | 4 |
| NR | 50 | 50 | 70 | 70 |
| SBR 1 | — | 40 | 20 | 90 |
| SBR 2 | 40 | — | — | — |
| BR | 10 | 10 | 10 | 10 |
| Carbon black 1 | 25 | — | 15 | 25 |
| Carbon black 2 | 25 | 50 | 35 | 25 |
| Wax | 1.0 | 1.0 | 1.0 | 1.0 |
| Antioxidant | 2.0 | 2.0 | 2.0 | 2.0 |
| Stearic acid | 2.0 | 2.0 | 2.0 | 2.0 |
| Zinc oxide | 4.0 | 4.0 | 4.0 | 4.0 |
| Oil | 3.0 | 3.0 | 3.0 | 3.0 |
| Sulfur | 1.5 | 1.5 | 1.5 | 1.5 |
| Vulcanization accelerator | 1.5 | 1.5 | 1.5 | 1.5 |

TABLE 1-continued

| Evaluation | | | | |
|---|---|---|---|---|
| Block chipping resistance | 100 | 97 | 85 | 88 |
| Abrasion resistance | 100 | 85 | 98 | 102 |
| Heat build-up characteristic | 100 | 110 | 111 | 108 |

From the results shown in Table 1, it is seen that in the tire having a tread composed of the rubber composition for a tread of the present invention comprising a rubber component comprising specific styrene butadiene rubber, isoprene-based rubber and butadiene rubber and carbon black A and carbon black B having different iodine adsorption amounts in predetermined amounts, block chipping resistance and an average performance of block chipping resistance, abrasion resistance and heat build-up characteristic are synergistically improved by interaction with the above-mentioned materials.

The invention claimed is:

1. A rubber composition for a tread comprising:
   10 to 30 parts by mass of carbon black A having an iodine adsorption amount of 130 mg/g or more and
   20 to 50 parts by mass of carbon black B having an iodine adsorption amount of 110 mg/g or more and less than 130 mg/g
   based on 100 parts by mass of a rubber component comprising 25 to 45% by mass of a styrene-butadiene rubber having a styrene content of 15% by mass or less and a vinyl content of from 30 to 50 mol %, 45 to 65% by mass of an isoprene-based rubber and 5 to 15% by mass of a butadiene rubber,
   wherein assuming that a content of the carbon black A is X part by mass, a content of the carbon black B is 0.6X to 4.5X part by mass.

2. The rubber composition for a tread of claim 1 comprising:
   10 to 30 parts by mass of carbon black A having an iodine adsorption amount of 130 mg/g or more and
   20 to 40 parts by mass of carbon black B having an iodine adsorption amount of 110 mg/g or more and less than 130 mg/g
   based on 100 parts by mass of a rubber component comprising 25 to 45% by mass of a styrene-butadiene rubber having a styrene content of 15% by mass or less and a vinyl content of from 30 to 50 mol %, 45 to 65% by mass of an isoprene-based rubber and 5 to 15% by mass of a butadiene rubber,
   wherein assuming that a content of the carbon black A is X part by mass, a content of the carbon black B is 0.6X to 2.5X part by mass.

3. A tire having a tread composed of the rubber composition for a tread of claim 1.

\* \* \* \* \*